United States Patent [19]

Kuribayashi et al.

[11] Patent Number: 4,543,391
[45] Date of Patent: Sep. 24, 1985

[54] POLYPHENYLENE ETHER COMPOSITIONS

[75] Inventors: Isao Kuribayashi, Yokosuka; Kunio Fukuda, Chigasaki, both of Japan

[73] Assignee: Asahi-Dow Limited, Tokyo, Japan

[21] Appl. No.: 323,101

[22] Filed: Nov. 19, 1981

Related U.S. Application Data

[63] Continuation-in-part of Ser. No. 301,228, Sep. 11, 1981, abandoned.

[30] Foreign Application Priority Data

Sep. 16, 1980 [JP] Japan ................. 55-127117

[51] Int. Cl.[4] ............................................. C08L 61/04
[52] U.S. Cl. .......................................... 525/68; 525/73; 525/74; 525/75; 525/76; 525/132; 525/139; 525/142; 525/143; 525/144
[58] Field of Search ................. 525/68, 132, 139, 142, 525/143, 144, 73, 74, 75, 76

[56] References Cited

U.S. PATENT DOCUMENTS

| | | | |
|---|---|---|---|
| 3,306,874 | 2/1967 | Hay | 525/905 |
| 3,306,875 | 2/1967 | Hay | 525/905 |
| 3,383,435 | 5/1968 | Cizek | 525/68 |
| 3,652,710 | 3/1972 | Holub et al. | 525/905 |
| 3,660,531 | 5/1972 | Lauchlan et al. | 525/68 |
| 3,819,761 | 6/1974 | Lee, Jr. | 525/68 |
| 3,960,808 | 6/1976 | Katchman | 525/68 |
| 3,976,725 | 8/1976 | Lee, Jr. | 525/68 |
| 4,127,558 | 11/1978 | Cooper | 525/68 |
| 4,038,343 | 7/1977 | Yonemitsu et al. | 525/68 |
| 4,127,558 | 5/1976 | Katchman et al. | 525/68 |
| 4,128,602 | 12/1978 | Katchman et al. | 525/68 |
| 4,128,603 | 12/1978 | Katchman et al. | 525/68 |
| 4,128,604 | 12/1978 | Katchman et al. | 525/68 |
| 4,154,712 | 5/1979 | Lee, Jr. | 525/68 |
| 4,386,176 | 5/1983 | Fukuda et al. | 525/68 |

*Primary Examiner*—Jacob Ziegler
*Attorney, Agent, or Firm*—Armstrong, Nikaido, Marmelstein & Kubovcik

[57] ABSTRACT

Polyphenylene ether compositions having enhanced commercial value as engineering resin, which are excellent in the appearance characteristics, such as surface gloss and weld part beauty, and stress crack resistance. The present resin composition is composed of a polyether resin (PPE) and a rubber reinforced high impact polystyrene (HIPS), if desired, together with a vinyl aromatic compound resin, wherein the PPE has specific characteristics with respect to the intrinsic viscosity, the eluting amount, and others.

81 Claims, 12 Drawing Figures

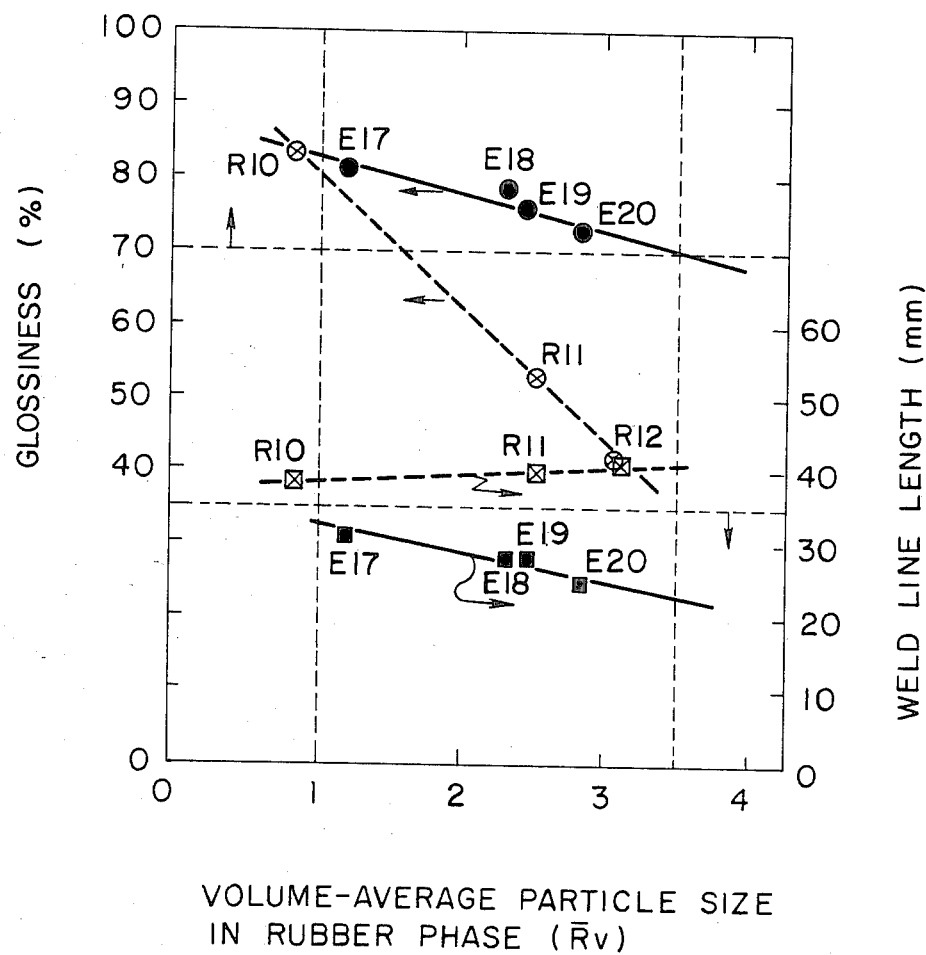

POLYPHENYLENE ETHER COMPOSITIONS

This is a continuation-in-part of U.S. application Ser. No. 301,228 filed Sept. 11, 1981, now abandoned.

The present invention relates to thermoplastic resin compositions mainly composed of polyphenylene ether (hereinafter referred to as PPE) resin and rubber-reinforced high impact polystyrene resin (hereinafter referred to as HIPS).

Particularly, the invention relates to aromatic polyether resin compositions having an excellent gloss and improved in crack resistance in molded articles in which a metal is inserted. The invention, more particularly, relates to the resin compositions mainly composed of PPE controlled in the molecular weight and reduced in the medium and low molecule content and HIPS, being restrained in the initiation of crack in a metal insert-filled molded article while keeping the excellent gloss.

At the same time, this invention also relates to resin compositions composed of PPE controlled in the molecular weight, reduced in the existing proportion of medium and low molecules and decreased in heterogeneous structure, and HIPS, together with a vinyl aromatic compound resin, or with a vinyl aromatic compound resin and a polyamide resin. Furthermore this invention relates to resin compositions having excellent appearance characteristics such as good gloss and less obvious weld parts, and superb strength to hold back crack initiation even if molded articles to which large internal or external stresses are applied, such as metal insert-filled molded articles and self-tapped molded articles, are caused to contact with oils, or chemical liquid, chemicals or gas.

The PPE resin is known as the resin excelling in mechanical properties, electrical properties, and heat resistance, but it is inferior in moldability and impact resistance. To improve the moldability and impact resistance simultaneously, accordingly, proposals had been made by adding polystyrene or acrylonitrile-butadiene-styrene terpolymer to PPE as in Japanese Examined Patent Publication No. 17812/1968 and U.S. Pat. No. 3,383,435. Later, in Japanese Examined Patent Publication No. 28659/1976, a resin composition composed of PPE resin and HIPS was known to excel in gloss and impact resistance, especially in the particle size range of rubber of 1 to 2 microns. But these compositions disclosed so far were inferior in stress crack resistance, and possessed fatal defects in practical use.

In the meantime, resin compositions composed of PPE resin and poly-α-olefin were disclosed in U.S. Pat. No. 3,361,851 and Japanese Examined Patent Publication No. 7069/1967. But these compositions were insufficient in the improvement of impact resistance, and, still worse, the gloss of the surface of molded articles reduced as the content of poly-α-olefin increased. Regarding modification of PPE resin by adding hydrogenated styrene-butadiene copolymer, methods had been disclosed, for instance, in Japanese Unexamined Patent Publication No. 8355/1976, but the molded articles obtained by the previous techniques hardly achieved a high gloss on the outer surface thereof, and in molded articles having welds on the surface the weld line length was long and the weld groove was deep, so that the appearance was not satisfactory. Besides, in compositions composed of PPE and other resins, attempts to improve by taking notice of the characteristics of other resins than PPE resin were made in numerous proposals. Thus, nearly all techniques to modify the PPE resin compositions were attempts to improve by taking notice of the characteristics of other components than PPE, and very few attempts were intended to improve the PPE resin compositions by paying attention to the characteristics of PPE itself.

The only exceptions were found in Japanese Examined Patent Publication No. 25992/1970 and Japanese Unexamined Patent Publication No. 51098/1973, in which were disclosed only the techniques to improve the moldability by increasing the portions of medium and low molecular weight and expanding the molecular weight distribution. In fact these techniques could improve the moldability, and also enhance the appearance as one of its effects, but the degree of improvement was small and the methods were accompanied by the disadvantage of lowering the stress crack resistance.

Generally, although the compositions of PPE resin and HIPS are applied also industrially, in order that they may be used in wide applications, improvements in appearance, crack resistance and self-tapping property have been keenly desired besides the improvements in moldability and impact resistance.

That many parts can be mounted on plastic molded articles, or that the materials and man-power can be greatly reduced by, for example, direct mounting of electrical parts on plastic housing without using special chassis, is a great industrial merit, and it is one of the major factors of wide applications of plastics so far. Concerning the methods of mounting such parts, the manufacturers in this industrial field are widely informed of the method of driving them in directly with metal screws by setting up a so-called boss part (which is called self-tapping method), and the method of using metal inserts. However, in these methods, there have been strong demands, in the case of self-tapping, for strengthening of tightening force (free screw torque) of the resin used, and, in the case of metal insert, for improvement of crack resistance of metal insert of the resin used since the plastic part around the insert is often broken when using, assembling, or storing the part after molding because thermal properties differ between the plastic and the metal.

It is an object of the present invention to present PPE resin compositions excelling in appearance characteristics, such as surface gloss and weld part beauty, and stress crack resistance. When these characteristics could be improved, the commercial value of PPE resins as the engineering resin would be remarkably enhanced.

In the accompanying drawings, FIG. 1 through FIG. 4 are intended to explain the measurements of physical properties of the resin compositions of the present invention.

FIG. 5 through FIG. 9, illustrate the effects of the present invention more clearly, with respect to the properties of the resin compositions in the examples according to the present invention, together with those of the referring examples, wherein the symbol E means the example and R means the referring examples.

Figure 1:
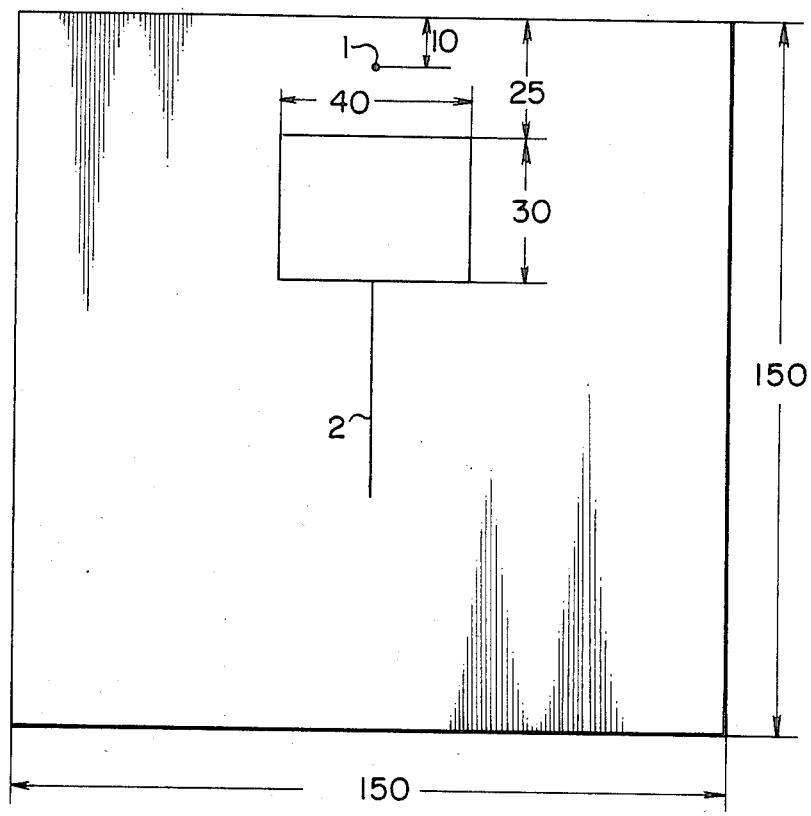
FIG. 1 is a plan of the injection-molded plate for weld line evaluation.

The present inventors took notice of the PPE resin, in particular, within the resin compositions, and intensively investigated in order to obtain molding materials having a favorable appearance and an excellent stress crack resistance in practical stage as stated above, and found out that the properties of molding materials were largely determined by the properties of PPE resin, the raw material for the resin compositions. Accordingly, as the result of various researches on the relationship between the properties of PPE resin as the constituent component and the physical properties of the composition, the inventors have reached the invention.

That is, the present invention is intended to present a resin composition which comprises being composed of 20 to 80 wt. % of polyphenylene ether (PPE), consisting of either a constituent unit [I] or constituent units [I] and [II] which are recurring units expressed by the general formulae

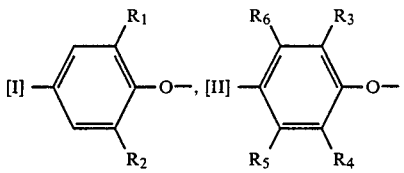

(where $R_1$, $R_2$, $R_3$, $R_4$, $R_5$ and $R_6$ are the same or different univalent residues, such as selected from alkyl radical containing one to four carbons, excluding tertiary butyl radical, aryl radical, halogen and hydrogen, provided $R_5$ and $R_6$ should not be hydrogen at the same time), and 80 to 20 wt. % of rubber reinforced high impact polystyrene (HIPS), wherein the PPE employed has the intrinsic viscosity $[\eta]$ (30° C., chloroform solution) in the range of 0.50 to 0.80, and eluting amount equivalent to polystyrene molecular weight of 3000 or less by gel permeation chromatography (GPC) of not more than 5 wt. %. It is further intended to present a resin composition which comprises being composed of 20 to 80 wt. % of PPE, and 80 to 20 wt. % of HIPS with vinyl aromatic compound resin, wherein the PPE employed has the intrinsic viscosity $[\eta]$ (30° C., chloroform solution) in the range of 0.50 to 0.80 and GPC eluting amount equivalent to polystyrene molecular weight of 300 or less of PPE of not more than 5 wt. %.

This invention also presents the resin composition wherein the PPE is poly(2,6-dimethyl-1,4-phenylene) ether and isolation or precipitation of said PPE from a dichloromethane solution containing 5 wt. % of said PPE (after letting stand 5 hours at 23° C.) is not less than 70%, and also comprises, in said compositions, a resin composition having HIPS, which is another constituent component, and of which volume-average particle size in elasticity phase ($\overline{R}v$) is 1.0 to 3.5 microns and the ratio of $\overline{R}v$ to $\overline{R}n$ (number-average particle size in said elasticity phase) ($\overline{R}v/\overline{R}n$) is not less than 3.0, as a favorable aspect of the embodiment.

The PPE used in the present invention is a single polymer or a copolymer consisting of constituent unit [I] or constituent units [I] and [II] which are recurring units expressed by the general formulae

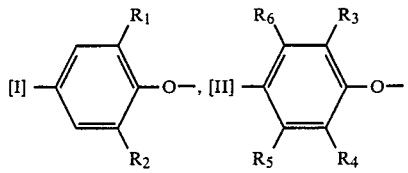

(where $R_1$, $R_2$, $R_3$, $R_4$, $R_5$ and $R_6$ are same or different univalent residues, such as selected from alkyl radical containing one to four carbons, excluding tertiary butyl radical, aryl radical, halogen and hydrogen, provided $R_5$ and $R_6$ should not be hydrogen at the same time).

Typical examples of PPE include homopolymers, such as poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chlor-1,4-phenylene) ether, poly(2-methyl-6-hydroxyethyl-1,4-phenylene) ether, and poly(2-methyl-6-chlorethyl-1,4-phenylene) ether.

The polyphenylene ether copolymer includes those mainly composed of polyphenylene ether structure which is copolymerized with an alkyl substituted phenol, such as o-cresol, 2,3,6-trimethylphenol as expressed in the general formula (where $R_3$, $R_4$, $R_5$ and $R_6$ are alkyl radical containing one to four carbons, excluding tertiary butyl radical, aryl radical, halogen and hydrogen, provided $R_5$ and $R_6$ should not be hydrogen at the same time).

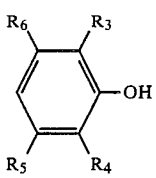

The intrinsic viscosity $[\eta]$ and the PGC eluting amount, of the PPE resin employed in the present invention were determined according to the conventional processes as described below.

The intrinsic viscosity $[\eta]$ was determined at 30° C. using chloroform as the solvent by means of Ubbellohde viscometer.

The amounts of GPC eluting portion of PPE equivalent to polystyrene molecular weight of 3,000 and 10,000 were determined by the following method.

The apparatus was Model HLC-802 of Toyo Soda Industries, Ltd., the columns were G5000H, G4000H, G3000H and G2500H of the same manufacturer, and the detector was a differential refractometer. Chloroform was used as the mobile phase, and the GPC curve of PPE was measured at the sample concentration of 0.5% at 40° C. When determining the relationship between the eluting period of time and molecular weight, polystyrene was used as the standard substance, and the percentages below the molecular weight of 3,000 and 10,000 were found from the area ratios according to the molecular weight distribution of PPE. In this way, the amounts of eluting portions below the polystyrene molecular weight of 3,000 and 10,000 of PPE were measured. In the case, also, where the PPE component was extracted from the composition according to the method as mentioned later, the respective values were determined according to this method.

In this invention, if the [$\eta$] of PPE which is the component of the composition is less than 0.50, the stress crack resistance is inferior. Accordingly, the [$\eta$] should be not less than 0.50, and preferably not less than 0.55. In the case where PPE is poly(2,6-dimethyl-1,4-phenylene) ether and is what is extracted from the composition according to the method as mentioned later, it is more desirably not less than 0.60. If, however, the [$\eta$] is over 0.80, appearance characteristics such as gloss and weld part become worse. Accordingly, the [$\eta$] should be not more than 0.80, and preferably not more than 0.75.

While the [$\eta$] remains within the range of 0.50 to 0.80, the crack resistance is slightly improved, as the viscosity of PPE increases, and the rate of improvement is remarkable when the PPE rate of medium and low molecular weight equivalent to polystyrene molecular weight of 3000 or less decreases.

When the eluting portion equivalent to polystyrene molecular weight of 10,000 or less by GPC analysis exceeds 8%, the moldability is improved, but the stress crack resistance drops. Therefore, the eluting amount equivalent to molecular weight of 10,000 or less is preferably not more than 8%, and more preferably not more than 6%.

In the case where the PPE in the present invention is poly(2,6-dimethyl-1,4-phenylene) ether, the characteristics of the PPE is determined on what is extracted from the composition according to the method mentioned below.

Six grams of the composition is added to 200 cc of chloroform. After shaking 3 hours at the room temperature, the solution is centrifuged for 45 minutes at 52,000 G, and is separated into the insoluble portion and the solution portion. The solution portion is carefully dropped into 1,000 cc of methanol while stirring and is sedimented again. Then the sediment is filtered out by a G4-mesh glass filter, and is washed with 1,000 cc of methanol poured. Later, the filtered substance is taken out and is dried in reduced pressure for an hour at 145° C. in nitrogen atmosphere to obtain sample I. In this case, the solvent or nonsolvent may be properly selected according to the properties of the other resins and the additives.

Depending on the content of poly(2,6-dimethyl-1,4-phenylene) ether determined by the infrared spectrum method, sample I is dissolved in dichloromethane so that the concentration is 5 wt. %. Then this solution is let stand for 24 hours at −5° C. to precipitate poly(2,6-dimethyl-1,4-phenylene) ether component. Afterwards the component is filtered out on a G4-mesh glass filter, and is washed with dichloromethane poured. The filtered substance is dried in reduced pressure for 30 minutes at 145° C. under nitrogen atmosphere to obtain sample II.

On sample II, using Ubbellohde viscometer, the intrinsic viscosity [$\eta$] at 30° C. is determined using chloroform as solvent, and it is regarded as the intrinsic viscosity [$\eta$] of poly(2,6-dimethyl-1,4-phenylene) ether component in the resin composition.

Determination of the amount of poly(2,6-dimethyl-1,4-phenylene) ether isolated from the dichloromethane is carried out according to the following method.

The content of poly(2,6-dimethyl-1,4-phenylene) ether in sample I is determined by the infrared spectrum method, and the sample is dissolved in dichloromethane so that the concentration is 5 wt. %, and this solution is let stand at 23° C. The poly(2,6-dimethyl-1,4-phenylene) ether once dissolved in dichloromethane is isolated again by the principle stated in J. Polymer Sci. B7, 205 (1969) and U.S. Pat. No. 3,644,227. After letting stand five hours, the precipitate is separated by using a G4-mesh glass filter, and is weighed after washing and drying to determine the isolated amount.

The present inventors further investigated optimum PPE component to succeed in finding that, when the PPE is poly(2,6-dimethyl-1,4-phenylene) ether satisfying all of the requirements for PPE mentioned above, an isolation amount from a solution thereof in dichoromethane greatly influences to characteristic features of the present composition, for example, practical stress crack resistance and such appearance characteristics as gloss and weld lines are improved when poly(2,6-dimethyl-1,4-phenylene) ether wherein a large amount of an isolated product is obtained from a solution thereof in dichloromethane is used.

In the optimum embodiment of this invention, when poly(2,6-dimethyl-1,4-phenylene) ether component isolating or precipitating from a dichloromethane solution containing 5 wt. % of the component is less than 70 wt. % at 23° C. after 5 hours, the appearance does not become better, and the stress crack resistance is not improved further. Accordingly, the amount of isolation of poly(2,6-dimethyl-1,4-phenylene) ether component is desirably not less than 70 wt. %, and more preferably not less than 80 wt. %.

In the present invention, the content of PPE in the resin composition is preferably 20 to 80 parts by weight, or more preferably 25 to 70 parts by weight. When the content is less than 20 parts by weight, the improving effect by PPE is not sufficiently exhibited. On the other hand, if the content exceeds 80 parts by weight, the fluidity is undesirably worsened by the properties of PPE itself, so that the improvement of appearance may not be sufficient.

The method for preparing PPE used in the present invention is not particularly limited. It may be obtained, for example, by using an ordinary metal complex as catalyst and causing a specific 2,6-di-substituted phenol to react to oxidize in the liquid. The catalyst may be anything that promotes oxidative polymerization reaction of 2,6-di-substituted phenols. Usually, a metal complex composed of a metal salt and an amine compound is used. As required, a reaction promoter such as alkali metal hydroxides and alcohols may be used at the same time. As polymerization reaction solvent, anything that dissolves 2,6-di-substituted phenols and is inert to the reaction may be used. In this case, the polymerization reaction solvent may completely dissolve PPE, partly dissolve it, or not dissolve it at all. For instance, when a mixture of a good solvent to PPE such as toluene, xylene and ethylbenzene, and a nonsolvent such as alcohols is used as the solvent, PPE of high molecular weight isolates in granular form, which forms a slurry. By controlling the solvent composition and taking out only slurry particles, PPE suitable for the practice of the present invention may be obtained. The polymerization reaction apparatus may be either of batch type or of continuous type, but although the reason is unknown, the continuous type is easier to obtain PPE suitable for the practice of the present invention. The polymerization temperature is controlled within the range of 40° to 60° C.; preferably, the temperature range of 40° to 50° C. is suited to obtain the PPE of this invention.

The rubber-reinforced high-impact polystyrene (HIPS) referred to in this invention is that having rubber-like polymers dispersed in insular (island) form in the resin phase made of polystyrene. It is prepared by polymerizing styrene monomer in the presence of rubber-like polymers, whether in the presence or in the absence of radical polymerization initiator, according to bulk polymerization, solution polymerization, bulk suspension polymerization, or emulsion polymerization method.

As the rubber, butadiene rubber, styrene-butadiene copolymer rubber or similar rubber may be used.

The intrinsic viscosity [$\eta$] (30° C., chloroform solution) of the polystyrene resin phase is preferably 0.6 to 1.0.

Regarding the blending ratio of PPE to HIPS, as mentioned earlier, when the content of PPE exceeds 80 parts by weight, the processability is insufficient and the material is not applicable to the most cases; when less than 20 parts by weight, the heat resistance, which is an important feature of PPE, is sacrificed. On the other hand, as the content of rubber-like polymer in the resin composition increases, the impact strength and crack resistance are improved, but it is not preferable since the self-tapping performance, which is an important property in tightening parts as structural parts, and appearance characteristics are lowered. Therefore, the content of rubber-like polymer is on the basis of the weight of final composition, 2.5 to 10 wt. %, preferably 3 to 8 wt. %.

When the content of rubber-like polymer in the final composition is in the range of 2.5 to 10 wt. %, both HIPS and non-rubber-reinforced styrene resin may be used at the same time. For example, HIPS and polystyrene may be used at the same time.

Methods of producing HIPS regulated of its particle size of elastomer phase (rubber phase) are well known industrially. For example, as shown in U.K. Pat. No. 1,174,214, U.S. Pat. No. 2,694,692, U.S. Pat. No. 3,243,481, or Journal of Polymer Science Vol. 9, page 2887, the particle size may be regulated by the agitating conditions at the time of bulk polymerization. Or, as in emulsion polymerization of SBR or polybutadiene, it is also possible to control the rubber phase particle size by adjusting the rubber particle size in the state of rubber latex and carrying out the emulsion polymerization by addition of a vinyl aromatic compound. Or, by combinedly using two or more HIPS differing in rubber phase particle size, desired particle size and particle size distribution may be obtained.

As the particle size of HIPS in rubber phase decreases, the impact strength and glossiness increase, but crack resistance drops, which poses a serious problem in practical application. A large particle size is good for improvement of crack resistance, but is not good for the surface glossiness of molded articles.

The present invention is also intended to solve this contradiction. That is, by controlling the particle size of HIPS in rubber phase so that the volume-average particle size ($\overline{R}v$) may be 1.0 to 3.5 microns, or more preferably 1.0 to 3.0 microns, and that the ratio of volume-average particle size ($\overline{R}v$) to number-average particle size ($\overline{R}n$), ($\overline{R}v/\overline{R}n$) may be not less than 3.0, or more preferably not less than 4.0, resin compositions of excellent crack resistance and good weld lines, which are important elements for the appearance of molded articles, may be obtained while keeping the impact strength and surface glossiness at a high level. In this invention, the particle size of rubber phase is a measurement of an ultra-thin segment by electron microscope according to the method well known to those skilled in the art, and the volume-average particle size ($\overline{R}v$) was determined in the formula below.

$$\overline{R}v = \frac{\Sigma niRi^4}{\Sigma niRi^3}$$

where ni is the number of rubber particles in rubber phase and Ri is the diameter of particles. At least 2,000 rubber particles were measured, and when the shape of a particle was not spherical, the longer diameter (a) and the shorter diameter (b) were measured, and a sphere measuring $\sqrt{a \cdot b}$ in diameter was assumed.

The vinyl aromatic compound resin referred to in the present invention is polymers of one or more aromatic vinyl compounds, or a copolymer of a vinyl aromatic compound and a compound copolymerizable with the vinyl aromatic compound, such as acrylonitrile, methyl methacrylate, acrylate ester, $\alpha,\beta$-unsaturated carboxylic acid anhydride, and imide compound of $\alpha,\beta$-unsaturated carboxylic acid. Examples of the vinyl aromatic compound include styrene, $\alpha$-methylstyrene, p-methylstyrene, dimethylstyrene, and ethylvinyltoluene.

In this invention, $\alpha,\beta$-unsaturated carboxylic acid anhydride forming a copolymer with the vinyl aromatic compound may be any compound that copolymerizes with the vinyl aromatic compound, and its examples may include maleic anhydride, chloromaleic anhydride, citraconic anhydride, butenylsuccinic anhydride, and tetrahydrophthalic anhydride.

The imide compound of $\alpha,\beta$-unsaturated carboxylic acid forming a copolymer with the vinyl aromatic compound in this invention may be expressed by the general formula:

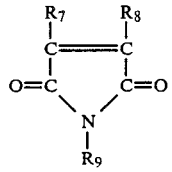

(where $R_7$, $R_8$ and $R_9$ refer to hydrogen atom, alkyl radical, alkenyl radical, cycloalkyl radical, phenyl radical, phenylene radical and alkylene radical). Examples of this compound may include maleinimide, N-methylmaleinimide, N-cyclohexylmaleinimide, N-butylmaleinimide, N-phenylmaleinimide, N-(p-methylphenyl)maleinimide, N-(3,5-dimethylphenyl)maleinimide, N-(p-methoxyphenyl)maleinimide, N-benzylmaleinimide and N-(1-naphthyl)maleinimide.

In this invention, as required, a minor amount of poly-$\alpha$-olefin may be added. In this case, polyethylene, polypropylene, polybuten-1 or the like may be used as the poly-$\alpha$-olefin, and its content may be 0.1 to 3 parts by weight, or preferably 0.5 to 1.5 parts by weight. If the content is more than 3 parts by weight, peeling occurs and gloss decreases.

Besides, hydrogenated or not hydrogenated styrene-butadiene copolymer may be also added.

The production of the resin composition in this invention is not particularly limited, and various mixing or kneading methods using extruder, heating roll, kneader, Bumbury mixer or other mixer may be applied. When mixing the resin composition of this invention by means of a mixer, it is more desired to mix in the presence of an antioxidant and/or in the nitrogen atmosphere. When mixed under such conditions, decrease of the rate of isolation of PPE component from dichloromethane solution is arrested, probably thanks to restriction of occurrence of heterogeneous bonding of PPE due to thermal oxidation, so that compositions excelling in both appearance and stress cracking resistance may be obtained.

The resin composition of the present invention may contain other additives, such as plasticizers, flame retardants, antioxidants, ultraviolet absorbers and similar stabilizers, or dyes or pigments. Besides, glass fiber, carbon fiber, calcium carbonate, talc, and other fillers may be added.

Working examples are explained below, but this invention is not limited to these examples alone. Unless otherwise noted, the resin compositions were pelletized by kneading and producing the mixture of PPE, HIPS and other components by means of a 30 mm twin extruder at about 250° to 300° C. These pellets were injection-molded to obtain test pieces. Physical properties of the test pieces were measured in the following methods.

Izod impact strength: JIS K 6871.
Tensile strength: JIS K 6871.
Melt flow: JIS 7210, temperature 250° C.
Heat distortion temperature: JIS K 7207.
Glossiness: Measured at reflection angle of 60° by means of Suga Tester Co.'s UGV-4D.

Weld line: Injection-molded plate for weld line evaluation measuring 150 mm × 150 mm × 2 mm as shown in FIG. 1 was used, in which 1 is the gate, 2 is the weld line, which should be as short as possible.

Figure 2:
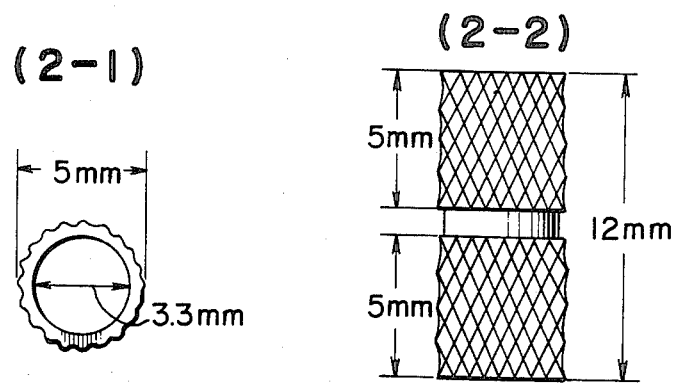
FIG. 2 shows the insert metal for crack resistance measurement and its dimensions, of which (2-1) is a plan and (2-2) is a side view.
Figure 3:
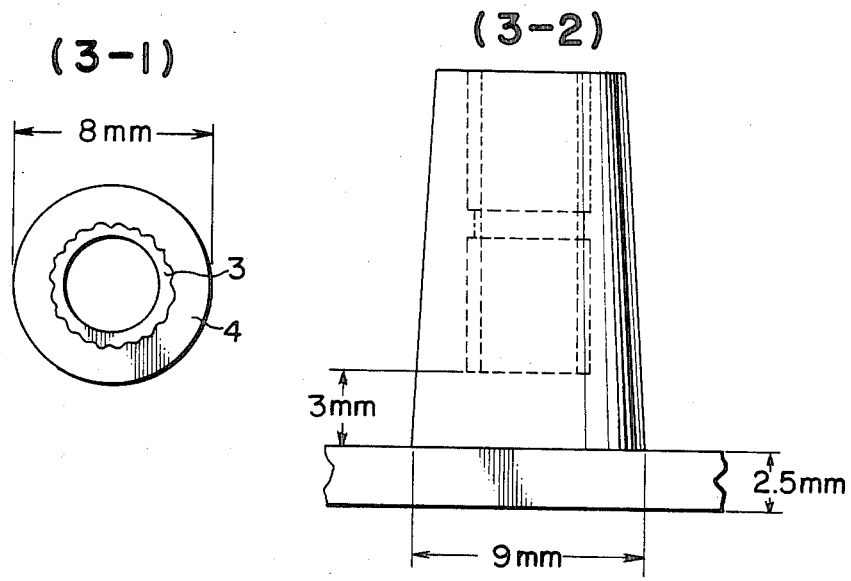
FIG. 3 illustrates the segment cut out from the boss part for crack resistance evaluation having the insert metal in FIG. 2 inserted into the resin composition and its dimensions, of which (3-1) is a plan and (3-2) is a side view.

Crack resistance (insert breaking torque): A brass insert metal of which inner surface was threaded to M-4 screw and outer surface knurled as shown in FIG. 2 was insert-injection molded into the boss as shown in FIG. 3 wherein 3 is the insert metal and 4 is resin, and the boss part was cut out after molding, and dipped in n-heptane at 23° C. for ten minutes, and was taken out and dried. Test pieces inferior in crack resistance were largely cracked, and those excelling therein were hardly cracked. In order to determine the crack resistance numerically, an M-4 screw was driven in, and the value of torque to breakage of the boss part was obtained in a torque meter. That is, when the crack resistance is poor, since cracks are formed in test pieces, the boss will be broken at a smaller torque, while test pieces of good crack resistance hold on to a higher torque.

Figure 4:
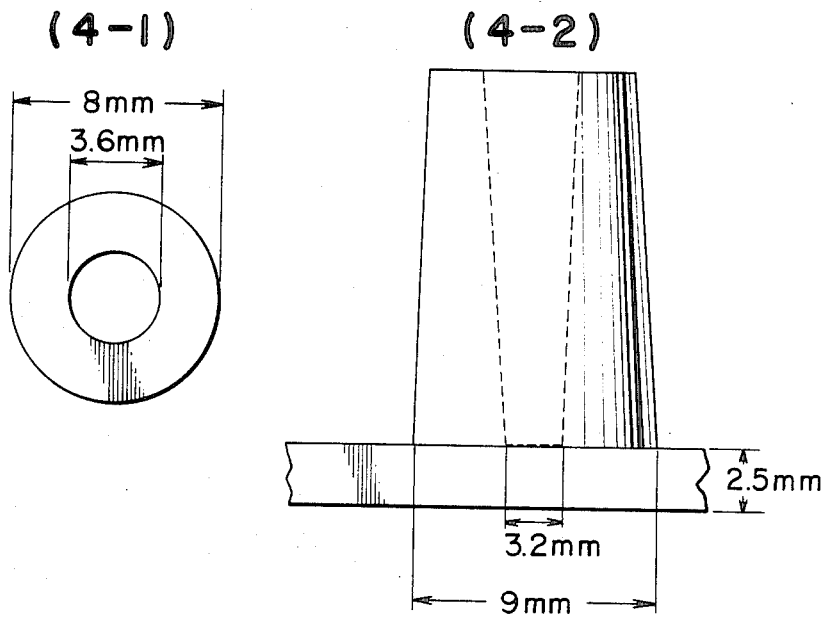
FIG. 4 shows the boss for evaluation of self-tapping performance and its dimensions, of which (4-1) is a plan of its upper part and (4-2) is a side view.
Figure 5:
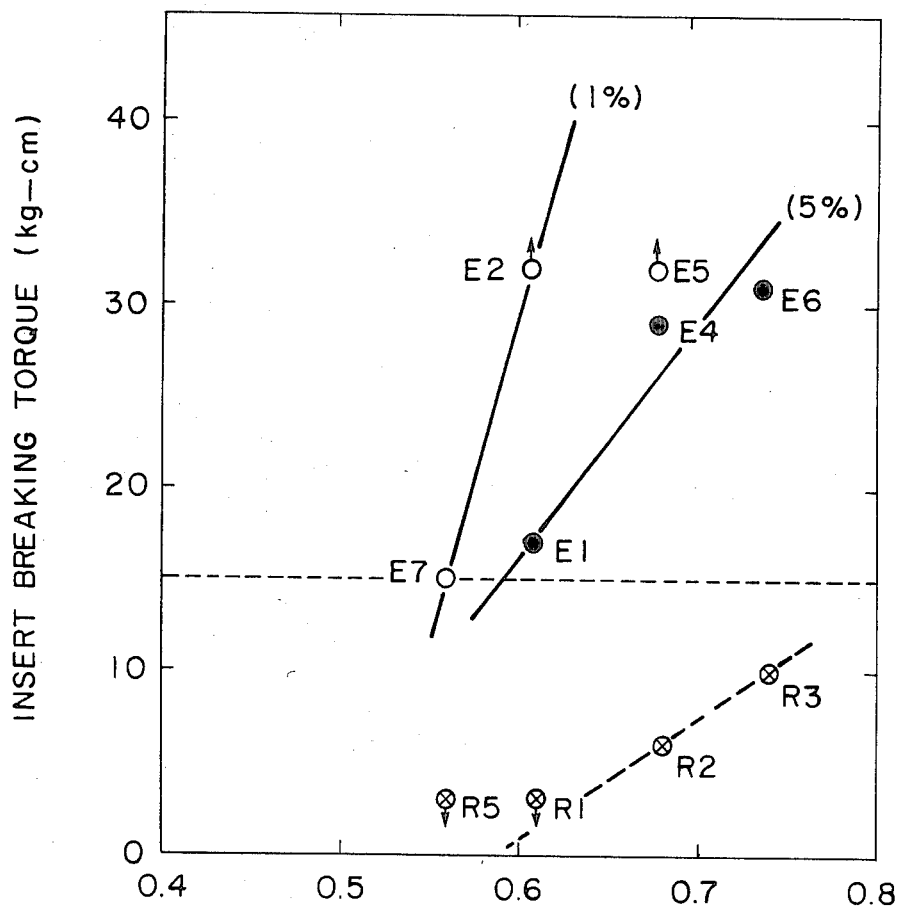
Figure 6:
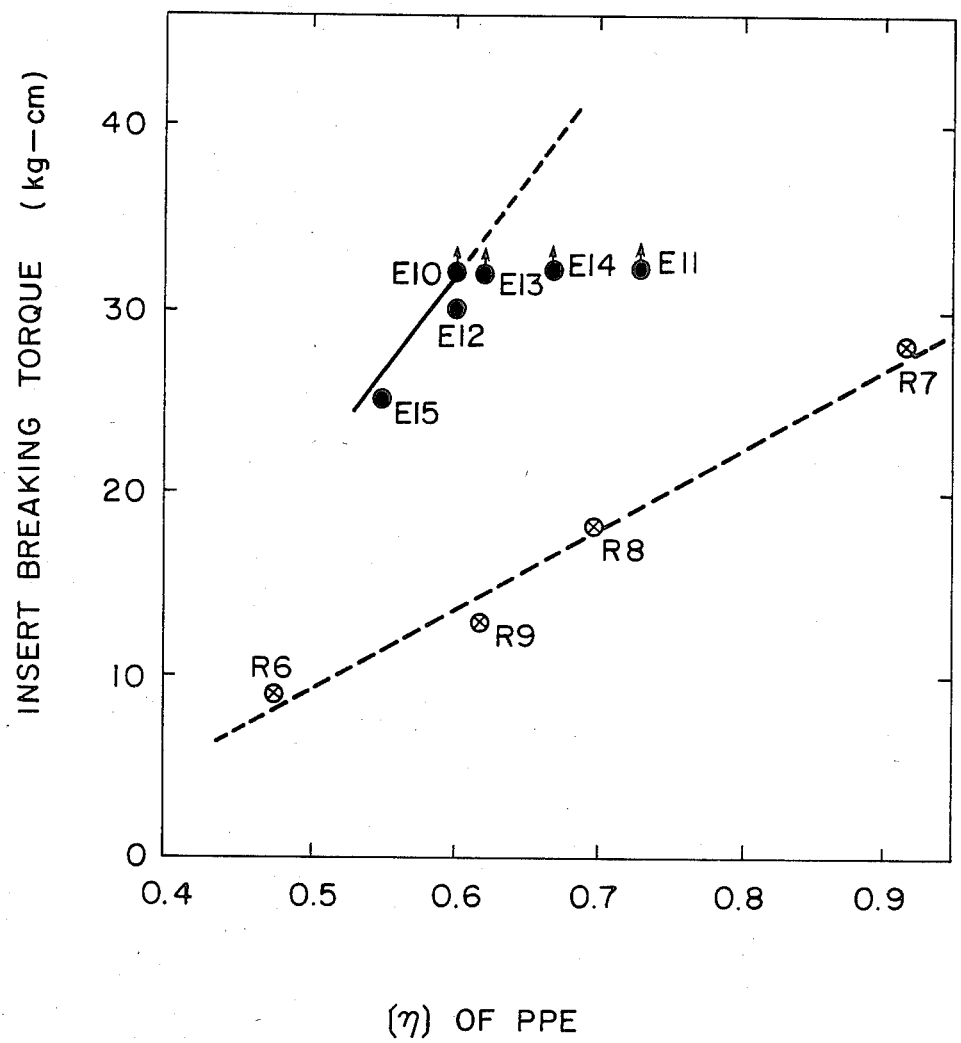
Figure 7:
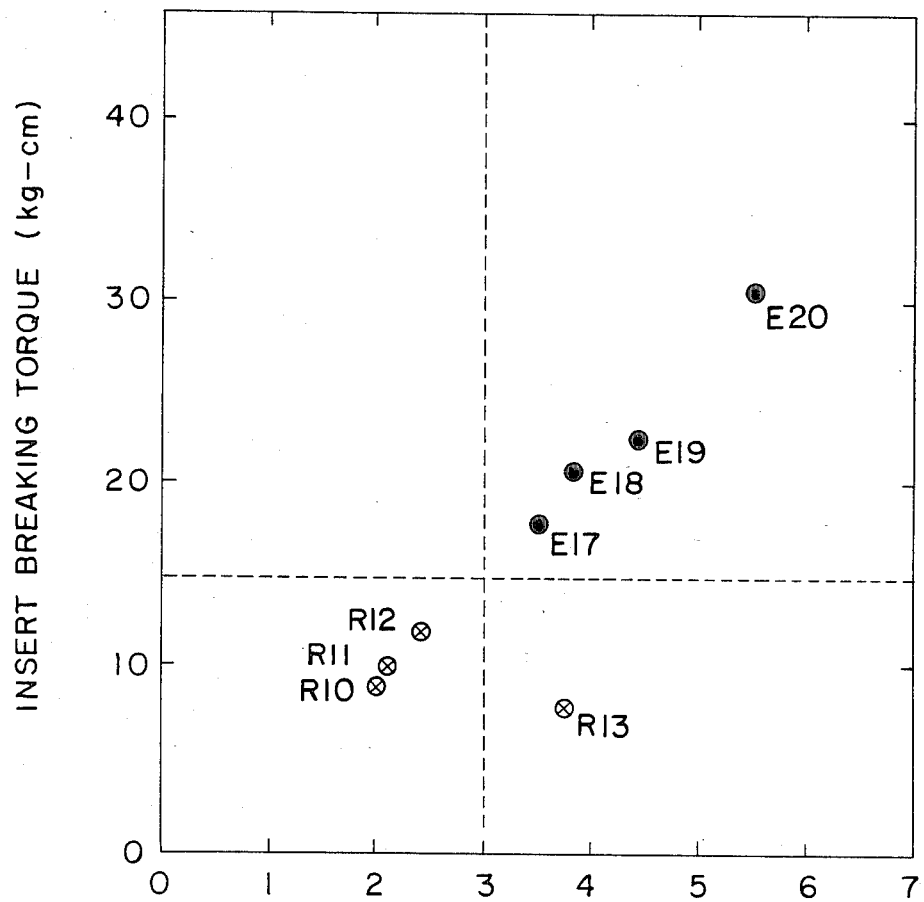
Figure 8:
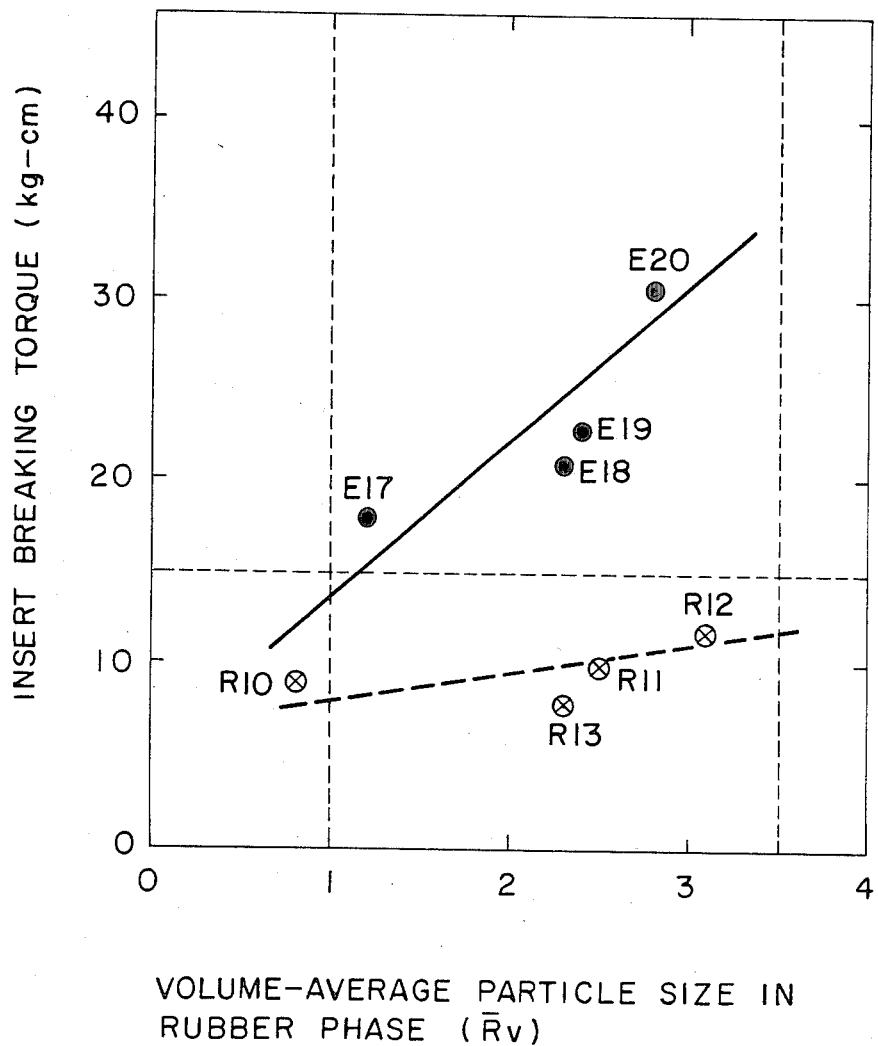

Self-tapping free screw torque: Free screw torque was measured by self-tapping into the boss shown in FIG. 4 by means of an M-4 screw. That is, a high free screw torque means a strong tightening force with parts, which is, therefore, preferable.

EXAMPLES 1 TO 9 AND REFERRING EXAMPLES 1 TO 5

Using test pieces made by injection molding after pelletizing the resin composition according to the method specified below, the physical properties were measured in the above methods.

(Conditions of Producing the Composition)

Using a 32 mm$\phi$ counter-rotary twin extruder (Nakatani Machinery Co.'s AS-30, L/D=32), the resin was extruded at screw rotating speed of 60 rpm to be pelletized in the blending proportion shown in Table 1, at the following cylinder temperatures.

| PPE content | Cylinder temperature (°C.) | | | | | | |
|---|---|---|---|---|---|---|---|
| | Zone 1 | Zone 2 | Zone 3 | Zone 4 | Zone 5 | Adapter | Die |
| 40 parts | 240 | 260 | 290 | 290 | 290 | 285 | 280 |
| 50 parts | 240 | 270 | 300 | 300 | 290 | 285 | 285 |
| 60 parts | 250 | 280 | 310 | 300 | 295 | 290 | 290 |

The charge was 10 kg in all cases.

When the homopolymer of PPE is poly(2,6-dimethyl-1,4-phenylene) ether, the relationship between the number-average molecular weight $\overline{Mn}$ and intrinsic viscosity [$\eta$] is expressed in the formula below:

$$[\eta] = 1.47 \times 10^{-4} \overline{Mn}^{0.85}$$

(where the intrinsic viscosity is expressed in the unit of dl/g, and measured in 30° C. chloroform solution). Since the molecular weight of polymer in recurring unit is 120, the number-average degree of polymerization n may be easily calculated from the value of [$\eta$]. In all examples, the molecular weight was expressed in terms of intrinsic viscosity.

The results of measurement of physical properties are shown in Table 1, in which the blend is expressed by parts by weight and the percentage by wt. % (the same expressions are used throughout).

From Table 1 it is known that the resin compositions according to the present invention are well-balanced compositions holding a practical impact resistance and a large insert breaking torque, excelling in insert crack resistance, and having a high level of glossiness.

TABLE 1

| | Example 1 | Example 2 | Example 3 | Example 4 | Example 5 | Example 6 | Example 7 |
|---|---|---|---|---|---|---|---|
| Recipe | | | | | | | |
| Polyphenylene ether* [$\eta$] | 50 | 50 | 50 | 40 | 40 | 60 | 50 |
| (Medium molecular polyphenylene ether %; "Eluting amount less than equivalent to polystyrene molecular weight of 3,000") | (0.61) (5%) | (0.61) (1%) | (0.68) (4%) | (0.68) (5%) | (0.68) (1%) | (0.74) (5%) | (0.56) (1%) |
| **Diene rubber-reinforced high-impact polystyrene | 50 | 50 | 50 | 60 | 60 | 40 | 50 |
| Polyethylene | 1.5 | 1.5 | 1.5 | 1.5 | 1.5 | 1.5 | 1.5 |
| Physical properties | | | | | | | |

TABLE 1-continued

| | | | | | | | |
|---|---|---|---|---|---|---|---|
| Insert breaking torque (Kg-cm) | 17 | 32 or more | 32 or more | 29 | 32 or more | 31 | 15 |
| Melt flow rate (g/10 min.) | 3.5 | 3.5 | 2 | 5 | 5 | 0.8 | 5 |
| Tensile strength (Kg/cm$^2$) | 560 | 560 | 564 | 505 | 506 | 620 | 560 |
| Heat distortion temperature (°C.) | 122 | 123 | 123 | 111 | 112 | 133 | 122 |
| Izod impact strength (Kg · cm/cm$^2$) | 18 | 18 | 19 | 19 | 19 | 20 | 15 |
| Glossiness (%) | 81 | 81 | 80 | 83 | 83 | 80 | 83 |

| | Example 8 | Example 9 | Referring example 1 | Referring example 2 | Referring example 3 | Referring example 4 | Referring example 5 |
|---|---|---|---|---|---|---|---|
| Recipe | | | | | | | |
| Polyphenylene ether* [η] (Medium molecular polyphenylene ether %; "Eluting amount less than equivalent to polystyrene molecular weight of 3,000") | 60 (0.56) (0.5%) | 40 (0.59) (4%) | 50 (0.61) (10%) | 40 (0.68) (10%) | 60 (0.74) (12%) | 50 (0.56) (10%) | 50 (0.56) (6%) |
| **Diene rubber-reinforced high-impact polystyrene | 40 | 60 | 50 | 60 | 40 | 40 | 50 |
| Polyethylene | 1.5 | 1.5 | 1.5 | 1.5 | 1.5 | 6.5 ***5 | 1.5 |
| Physical properties | | | | | | | |
| Insert breaking torque (Kg-cm) | 19 | 15 | 3 or less | 6 | 10 | 26 | 3 or less |
| Melt flow rate (g/10 min.) | 4 | 5 | 4 | 5 | 1 | 5 | 5 |
| Tensile strength (Kg/cm$^2$) | 618 | 515 | 550 | 504 | 620 | 500 | 546 |
| Heat distortion temperature (°C.) | 131 | 114 | 120 | 111 | 133 | 120 | 120 |
| Izod impact strength (Kg · cm/cm$^2$) | 18 | 17 | 16 | 19 | 20 | 19 | 15 |
| Glossiness (%) | 81 | 82 | 81 | 83 | 80 | 55 | 81 |

NOTES:
*PPE: Poly(2,6-dimethyl-1,4-phenylene) ether in Examples 1-8; Copolymer of 2,6-dimethylphenol (90 mole %) and 2,3,6-trimethylphenol (10 mole %) in Example 9.
**[η]: 0.85, containing 10% diene rubber, weight-average rubber particle size: 1.5 microns
***Hydrogenated SB block elastomer

EXAMPLE 10

The composition was obtained by kneading 50 parts of poly(2,6-dimethyl-1,4-phenylene) ether and 50 parts of rubber-reinforced polystyrene containing 12% of butadiene component, at 270° C. by means of an extruder.

EXAMPLE 11

The composition was obtained by kneading 50 parts of poly(2,6-dimethyl-1,4-phenylene) ether, 50 parts of rubber-reinforced polystyrene containing 12% of butadiene component, and 0.5 parts of 2,6-di-tertiary-butyl-p-cresol, at 260° C. by means of an extruder in nitrogen atmosphere.

EXAMPLE 12

The composition was obtained by kneading 75 parts of poly(2,6-dimethyl-1,4-phenylene) ether, 25 parts of reinforced polystyrene containing 24% of butadiene component, 1 part of polyethylene, and 0.5 parts of 2,6-di-tertiary-butyl-p-cresol, at 320° C. by means of an extruder in nitrogen atmosphere.

EXAMPLE 13

The composition was obtained by kneading 40 parts of poly(2,6-dimethyl-1,4-phenylene) ether, 50 parts of rubber-reinforced polystyrene containing 12% of butadiene component, 1 part of polyethylene, and 0.75 parts of tris(nonylphenyl) phosphite, at 260° C. by means of an extruder.

EXAMPLE 14

The composition was obtained by kneading 59 parts of poly(2,6-dimethyl-1,4-phenylene) ether, 35 parts of rubber-reinforced polystyrene containing 24% of butadiene component, 2 parts of hydrogenated styrene-butadiene copolymer containing 20% of styrene component, and 4 parts of triphenyl phosphate, at 280° C. by means of an extruder in nitrogen atmosphere.

EXAMPLE 15

The composition was obtained by kneading 35 parts of poly(2,6-dimethyl-1,4-phenylene) ether, 50 parts of rubber-reinforced polystyrene containing 12% of butadiene component, 15 parts of polystyrene, and 1 part of 2,6-di-tertiary-butyl-p-cresol, at 250° C. by means of an extruder.

REFERRING EXAMPLE 6

The composition was obtained by kneading 50 parts of poly(2,6-dimethyl-1,4-phenylene) ether, and 50 parts of reinforced polystyrene containing 12% of butadiene, at 270° C. by means of an extruder in nitrogen atmosphere.

REFERRING EXAMPLE 7

The composition was obtained by kneading 50 parts of poly(2,6-dimethyl-1,4-phenylene) ether, obtained by polymerizing 2,6-xylenol containing 0.5% of o-cresol in the starting material, and 50 parts of reinforced polystyrene containing 12% of butadiene component, at 350° C. by means of an extruder.

REFERRING EXAMPLE 8

The composition was obtained by kneading 85 parts of poly(2,6-dimethyl-1,4-phenylene) ether, 15 parts of reinforced polystyrene containing 24% of butadiene component, and 0.5 parts of 2,6-di-tertiary-butyl-p-cresol, at 310° C. by means of an extruder.

REFERRING EXAMPLE 9

The composition was obtained by kneading 50 parts of poly(2,6-dimethyl-1,4-phenylene) ether obtained by polymerizing 2,6-xylenol containing 0.8% of p-cresol in the starting material, and 50 parts of reinforced polystyrene containing 12% of butadiene component at 290° C. by means of an extruder.

EXAMPLE 16

The composition was obtained by kneading 50 parts of poly(2,6-dimethyl-1,4-phenylene) ether, 20 parts of styrene-N-phenylmaleinimide containing 85% of styrene, 30 parts of rubber-reinforced polystyrene containing 12% of butadiene component, and 1 part of 2,6-di-tertiary-butyl-p-cresol, at 280° C. by means of an extruder in nitrogen atmosphere.

The results of measurements of examples 10 to 16 and referring examples 6 to 9 are summarized in Table 2.

TABLE 2

|  | Examples |  |  |  |  |  |  | Referring examples |  |  |  |
|---|---|---|---|---|---|---|---|---|---|---|---|
|  | 10 | 11 | 12 | 13 | 14 | 15 | 16 | 6 | 7 | 8 | 9 |
| Characteristics of polyphenylene ether |  |  |  |  |  |  |  |  |  |  |  |
| (1) [η] dl/g | 0.60 | 0.73 | 0.60 | 0.62 | 0.67 | 0.55 | 0.60 | 0.46 | 0.92 | 0.70 | 0.62 |
| (2) Eluting amount less than equivalent to polystyrene molecular weight of 10,000, % | 4 | 3 | 5 | 4 | 3 | 4 | 4 | 10 | 4 | 4 | 14 |
| (3) Amount of isolation from dichloromethane solution, wt. % | 90< | 75 | 75 | 80 | 90< | 79 | 84 | 82 | 10> | 10> | 52 |
| Properties of the composition |  |  |  |  |  |  |  |  |  |  |  |
| (1) melt flow rate (g/10 min.) | 3.1 | 2.4 | 1.1 | 3.5 | 3.2 | 3.7 | 2.0 | 5.4 | 1.2 | 0.4 | 2.5 |
| (2) glossiness (%) | 92 | 84 | 80 | 90 | 90 | 92 | 83 | 89 | 41 | 43 | 52 |
| (3) weld length (mm) | 22 | 25 | 26 | 22 | 20 | 20 | 25 | 22 | 45 | 42 | 36 |
| (4) insert breaking torque (kg-cm) | 32< | 32< | 30 | 32< | 32< | 25 | 32< | 9 | 28 | 18 | 13 |

From Table 2 it is known that the resin compositions according to the present invention are well-balanced compositions holding a practical impact resistance and a large insert breaking torque, excelling in insert crack resistance, and having a high level of glossiness.

EXAMPLES 17 TO 20

The compositions were obtained by uniformly blending 50 parts of poly(2,6-dimethyl-1,4-phenylene) ether of which [η] is 0.71, 50 parts of rubber-reinforced polystyrene containing 8% of polybutadiene of which volume-average rubber particle sizes were 1.2, 2.3, 2.4, 2.8 microns and the ratios of volume-average rubber particle size/number-average rubber particle size were 3.5, 3.8, 4.4, 5.5, respectively, and 1 part of octadecyl-3-(3,5-di-tertiarybutyl-4-hydroxyphenyl) propionate (Ciba-Geigy's Irganox 1076) by means of a blender, followed by kneading by means of a biaxial extruder to form pellets. The results of measurement of the properties are shown in Table 3.

REFERRING EXAMPLES 10 L TO 12

The compositions were obtained similarly as in examples 17 to 20, except that the volume-average rubber particle sizes of rubber-reinforced polystyrene were 0.8, 2.5, 3.1 microns and the ratios of volume-average rubber particle size/number-average rubber particle size were 2.0, 2.1, 2.4, respectively. The properties of the compositions are shown in Table 3.

TABLE 3

|  | Examples |  |  |  | Referring examples |  |  |  |  |
|---|---|---|---|---|---|---|---|---|---|
|  | 17 | 18 | 19 | 20 | 10 | 11 | 12 | 13 | 14 |
| Izod impact strength 23° C. (kg-cm/cm notched) | 19 | 18 | 16 | 15 | 21 | 14 | 9 | 12 | 32 |
| Tensile strength (kg/cm²) | 575 | 570 | 570 | 565 | 580 | 570 | 570 | 540 | 440 |
| Melt flow (g/10 min.) | 3.4 | 3.6 | 3.5 | 3.6 | 3.2 | 3.4 | 3.4 | 4.6 | 2.1 |
| Glossiness | 81 | 79 | 76 | 73 | 84 | 53 | 42 | 80 | 44 |
| Weld line length (mm) | 31 | 28 | 28 | 25 | 38 | 40 | 42 | 25 | 63 |
| Insert breaking | 18 | 21 | 23 | 31 | 9 | 10 | 12 | 8 | 32 or more |

TABLE 3-continued

|  | Examples | | | | Referring examples | | | | |
| --- | --- | --- | --- | --- | --- | --- | --- | --- | --- |
|  | 17 | 18 | 19 | 20 | 10 | 11 | 12 | 13 | 14 |
| torque (kg-cm) | | | | | | | | | |
| Self-tapping free screw torque (kg-cm) | 26 | 25 | 25 | 25 | 26 | 25 | 24 | 23 | 12 |

REFERRING EXAMPLE 13

The composition was obtained similarly as in examples 17-20, except that $[\eta]$ was 0.48 and that the same rubber-reinforced polystyrene as used in example 18 was used. The properties are shown in Table 3.

REFERRING EXAMPLE 14

The composition was obtained by blending 50 parts of poly(2,6-dimethyl-1,4-phenylene) ether of which $[\eta]$ is 0.71, 50 parts of rubber-reinforced polystyrene containing 20% of polybutadiene of which volume-average rubber particle size is 2.9 microns and ratio of volume-average rubber particle size/number-average rubber particle size is 3.5, and 1 part of Irganox 1076. The properties of the composition are shown in Table 3.

From Table 3, it is known that the resin compositions by the present invention are products of excellent quality balance, having a truly high practical value.

What is claimed is:

1. A resin composition which consists essentially of 20 to 80 wt. % of polyphenylene ether, consisting of a consituent unit (I) or constituent units (I) and (II) which are recurring units expressed by the general formulae:

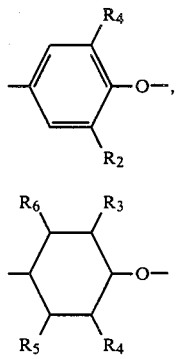

(wherein $R_1$, $R_2$, $R_3$, $R_4$, $R_5$ and $R_6$ are the same or different univalent residues selected from the group consisting of alkyl radical containing one to four carbons, excluding tertiary butyl radical, aryl radical, halogen and hydrogen, provided $R_5$ and $R_6$ should not be hydrogen at the same time), and 80 to 20 wt. % of rubber reinforced high impact polystyrene, wherein the polyphenylene ether employed has the intrinsic viscosity $(\eta)$ (30° C., chloroform solution) in the range of 0.50 to 0.80 and the eluting amount equivalent to polystyrene molecular weight of 3000 or less by gel permeation chromatography of not more than 5 wt. %.

2. A resin composition according to claim 1 wherein the intrinsic viscosity $(\eta)$ of the polyphenylene ether is in the range of 0.55 to 0.75.

3. A resin composition which consists essentially of 20 to 80 wt. % of polyphenylene ether, consisting of a constituent unit (I) or constituent units (I) and (II) which are recurring units expressed by the general formulae:

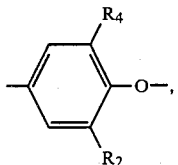
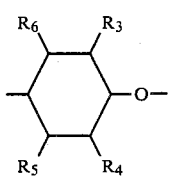

(wherein $R_1$, $R_2$, $R_3$, $R_4$, $R_5$, and $R_6$ are the same or different univalent residues selected from the group consisting of alkyl radicals containing one to four carbons, excluding tertiary butyl radical, aryl radical, halogen and hydrogen, provided $R_5$ and $R_6$ should not by hydrogen at the same time), and 80 to 20 wt. % of rubber reinforced high impact polystyrene, wherein the polyphenylene ether employed has the intrinsic viscosity $(\eta)$ (30° C., chloroform solution) in the range of 0.50 to 0.80 and the eluting amount equivalent to polystyrene molecular weight of 10,000 or less by gel permeation chromatography of not more than 8 wt. %.

4. A resin composition according to claim 3 wherein the gel permeation chromatography eluting amount equivalent to polystyrene molecular weight of 10,000 or less of the polyphenylene ether is not more than 6 wt. %.

5. A resin composition according to any one of claims 1 to 3 wherein the composition is 25 to 70 wt. % of polyphenylene ether and 75 to 30 wt. % of rubber reinforced high impact polystyrene.

6. A resin composition according to one of claims 1 to 4 wherein the rubber content in the composition is in the range of 2.5 to 10 wt. %.

7. A resin composition according to any one of claims 1 to 4 wherein the rubber content in the composition is in the range of 3 to 8 wt. %.

8. A resin composition according to claim 5 wherein the rubber content in the composition is in the range of 2.5 to 10 wt. %.

9. A resin composition according to claim 5 wherein the rubber content in the composition is in the range of 3 to 8 wt. %.

10. A resin composition consisting essentially of 20 to 80 wt. % of poly (2,6-dimethyl-1,4-phenylene) ether and 80 to 20 wt. % rubber reinforced high impact polystyrene, wherein the poly(2,6-dimethyl-1,4-phenylene) ether consists of having an intrinsic viscosity $(\eta)$ (30° C., chloroform solution) in the range of 0.50 to 0.80, the gel permeation chromatography eluting amount equivalent to polystyrene molecular weight of 3000 or less of not more than 5 wt. % and the isolating amount (after letting stand at 23° C. for 5 hours) from a dichloromethane solution containing 5 wt. % of the poly(2,6-dimethyl-1,4-phenylene) ether, of not less than 70%.

11. A resin composition according to claim 10 wherein the intrinsic viscosity ($\eta$) of the poly(2,6-dimethyl-1,4-phenylene) ether is in the range of 0.60 to 0.75.

12. A resin composition consisting essentially of 20 to 80 wt. % of poly (2,6-dimethyl-1,4-phenylene) ether and 80 to 20 wt. % rubber reinforced high impact polystyrene, wherein the poly(2,6-dimethyl-1,4-phenylene) ether consists of having an intrinsic viscosity ($\eta$) (30° C., chloroform solution) in the range of 0.50 to 0.80, the gel permeation chromatography eluting amount equivalent to polystyrene molecular weight of 10,000 or less of not more than 8 wt. %, and the isolating amount (after letting stand at 23° C. for 5 hours) from a dichloromethane solution containing 5 wt. % of the poly(2,6-dimethyl-1,4-phenylene) ether of not less than 70%.

13. A resin composition according to claim 12 wherein the gel permeation chromatography eluting amount equivalent to polystyrene molecular weight of 10,000 or less, of the poly(2,6-dimethyl-1,4-phenylene) ether, is not more than 6 wt. %.

14. A resin composition according to claim 10 wherein the isolating amount of the poly(2,6-dimethyl-1,4-phenylene) ether, after letting stand at 23° C. for 5 hours, from a dichloromethane solution containing 5 wt. % of the ether, is not less than 80 wt. %.

15. A resin composition according to any one of claims 10 to 14 wherein the composition is 25 to 70 wt. % of poly(2,6-dimethyl-1,4-phenylene) ether and 75 to 30 wt. % of rubber reinforced high impact polystyrene.

16. A resin composition according to any one of claims 10 to 14 wherein the rubber content in the composition is in the range of 2.5 to 10 wt. %.

17. A resin composition according to any one of claims 10 to 14 wherein the rubber content in the composition is in the range of 3 to 8 wt. %.

18. A resin composition according to claim 15 wherein the rubber content in the composition is in the range of 2.5 to 10 wt. %.

19. A resin composition according to claim 15 wherein the rubber content in the composition is in the range of 3 to 8 wt. %.

20. A resin composition which consist essentially of 20 to 80 wt. % of polyphenylene ether, consisting of a constituent unit (I) or constituent units (I) and (II) which are are recurring units expressed by the general formulae:

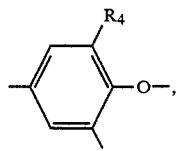

(I)

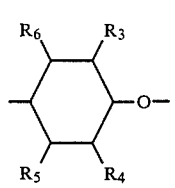

(II)

(wherein $R_1$, $R_2$, $R_3$, $R_4$, $R_5$ and $R_6$ are the same of different univalent residues selected from the group consisting of alkyl radical containing one to four carbons, excluding tertiary butyl radical, aryl radical, halogen and hydrogen, provided $R_5$ and $R_6$ should not be hydrogen at the same time), and 80 to 20 wt. % of rubber reinforced high impact polystyrene, wherein the polyphenylene ether employed has the intrinsic viscosity ($\eta$) (30° C., chloroform solution) in the range of 0.50 to 0.80 and the eluting amount equivalent to polystyrene molecular weight of 3000 or less by gel permeation chromatography of not more than 5 wt. %; and the rubber reinforced high impact polystyrene employed has the volume-average particle size ($\overline{R}v$) in elastomer phase, of 1.0 to 3.5 microns and the ratio of $\overline{R}v$ to $\overline{R}n$ (number-average particle size in the elastomer phase) ($\overline{R}v/\overline{R}n$), of not less than 3.0.

21. A resin composition according to claim 20 wherein the ($\overline{R}v/\overline{R}n$) is not less than 4.0.

22. A resin composition according to claim 20 or claim 21 wherein the composition is 25 to 70 wt. % of polyphenylene ether and 75 to 30 wt. % of rubber reinforced high impact polystyrene.

23. A resin composition according to claim 20 or claim 21 wherein the rubber content in the composition is in the range of 2.5 to 10 wt %.

24. A resin composition according to claim 20 or claim 21 wherein the rubber contact in the composition is in the range of 3 to 8 wt. %.

25. A resin composition according to claim 22 wherein the rubber content in the composition is in the range of 2.5 to 10 wt. %.

26. A resin composition according to claim 22 wherein the rubber content in the composition is in the range of 3 to 8 wt. %.

27. A resin composition according to claim 20 or claim 21 wherein the intrinsic viscosity ($\eta$) of the polyphenylene ether is in the range of 0.55 to 0.75.

28. A resin composition according to claim 22 wherein the intrinsic viscosity ($\eta$) of the polyphenylene ether is in the range of 0.55 to 0.75.

29. A resin composition according to claim 23 wherein the intrinsic viscosity ($\eta$) of the polyphenylene ether is in the range of 0.55 to 0.75.

30. A resin composition according to claim 24 wherein the intrinsic viscosity ($\eta$) of the polyphenylene ether is in the range of 0.55 to 0.75.

31. A resin composition according to claim 25 wherein the intrinsic viscosity ($\eta$) of the polypheylene ether is in the range of 0.55 to 0.75.

32. A resin composition consisting essentially of 20 to 80 wt. % of poly(2,6-dimethyl-1,4-phenylene) ether and 80 to 20 wt. % of rubber reinforced high impact polystyrene, wherein the poly(2,6-dimethyl-1,4-phenylene) ether consists of an intrinsic viscosity ($\eta$) (30° C., chloroform solution) in the range of 0.50 to 0.80, the gel permeation chromatography eluting amount equivalent to polystyrene molecular weight of 3000 or less of not more than 5%, and the isolating amount (after letting stand at 23° C. for 5 hours) from a dichloromethane solution containing 5 wt. % of the poly(2,6-dimethyl-1,4-phenylene) ether, of not less than 70 wt. %: and the rubber reinforced high impact polystyrene has the volume-average particle size ($\overline{R}v$) in the elastomer phase, of 1.0 to 3.5 microns and the ratio of $\overline{R}v$ to $\overline{R}n$ (number-average particle size in the elastomer phase ($\overline{R}v/\overline{R}n$) is not less than 3.0.

33. A resin composition according to claim 32 wherein the ($\overline{Rv}/\overline{Rn}$) is not less than 4.0.

34. A resin composition according to claim 32 or claim 33 wherein the composition is 25 to 70 wt. % of poly(2,6-dimethyl-1,4-phenylene) ether and 75 to 30 wt. % of rubber reinforced high impact polystyrene.

35. A resin composition according to claim 32 wherein the intrinsic viscosity ($\eta$) of the poly(2,6-dimethyl-1,4-phenylene) ether is in the range of 0.60 to 0.75.

36. A resin composition according to claim 32 wherein the isolating amount, after letting stand at 23° C. for 5 hours, from a dichloromethane solution containing 5 wt. % of the poly(2,6-dimethyl-1,4-phenylene) ether is not less than 80 wt. %.

37. A resin composition according to claim 32 or claim 33 wherein the rubber content in the composition is in the range of 2.5 to 10 wt. %.

38. A resin composition according to claim 34 wherein the rubber content in the composition is in the range of 2.5 to 10 wt. %.

39. A resin composition according to claims 35 or 36 wherein the rubber content in the composition is in the range of 2.5 to 10 wt. %.

40. A resin composition according to claim 32 or claim 33 wherein the rubber content in the composition is in the range of 3 to 7 wt. %.

41. A resin composition according to claim 34 wherein the rubber content in the composition is in the range of 3 to 7 wt. %.

42. A resin composition according to claims 35 or 36 wherein the rubber content in the composition is in the range of 3 to 7 wt. %.

43. A resin composition which consists essentially of 20 to 80 wt. % of polyphenylene ether, consisting of a constituent unit (I) or constituent units (I) and (II) which are recurring units expressed by the general formulae:

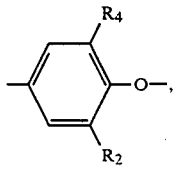
(I)

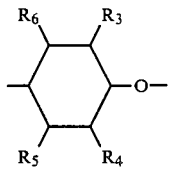
(II)

(wherein $R_1$, $R_2$, $R_3$, $R_4$, $R_5$ and $R_6$ are the same or different univalent residues selected from the group consisting of alkyl radical containing one to four carbons, excluding tertiary butyl radical, aryl radical, halogen and hydrogen, provided $R_5$ and $R_6$ should not be hydrogen at the same time) and 80 to 20 wt. % of rubber reinforced high impact polystyrene together with a vinyl aromatic compound resin, wherein the polyphenylene either employed has the intrinsic viscosity ($\eta$) (30° C., chloroform solution) in the range of 0.50 to 0.80 and the eluting amount equivalent to polystyrene molecular weight of 3000 or less by gel permeation chromatography of not more than 5 wt. %.

44. A resin composition according to claim 43 wherein the intrinsic viscosity ($\eta$) of the polyphenylene ether is in the range of 0.55 to 0.75.

45. A resin composition which consists essentially of 20 to 80 wt. % of polyphenylene ether, consisting of a constituent unit (I) or constituent units (I) and (II) which are recurring units expressed by the general formulae:

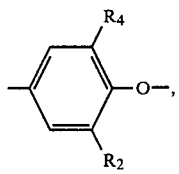
(I)

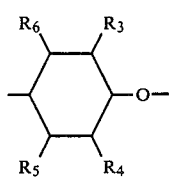
(II)

(wherein $R_1$, $R_2$, $R_3$, $R_4$, $R_5$ and $R_6$ are the same or different univalent residues selected from the group consisting of alkyl radical containing one to four carbons, excluding tertiary butyl radical, aryl radical, halogen and hydrogen, provided $R_5$ and $R_6$ should not be hydrogen at the same time) and 80 to 20 wt. % of rubber reinforced high impact polystyrene together with a vinyl aromatic compound resin, wherein the polyphenylene ether employed has the intrinsic viscosity ($\eta$) (30° C., chloroform solution) in the range of 0.50 to 0.80 and the eluting amount equivalent to polystyrene molecular weight of 10,000 or less by gel permeation chromatography of not more than 8 wt. %.

46. A resin composition according to claim 45 wherein the gel permeation chromatography eluting amount equivalent to polystyrene molecular weight of 10,000 or less, of polyphenylene ether is not more than 6 wt. %.

47. A resin composition according to claim 45 wherein the vinyl aromatic compound resin is a polymer selected from the group consisting of one or more vinyl aromatic compounds; or a copolymer of a vinyl aromatic compound and a compound copolymerizable with the vinyl aromatic compound selected from the group consisting of acrylonitrile, methyl methacrylate, acrylate ester, and $\alpha,\beta$-unsaturated carboxylic acid anhydride, and imide compound of $\alpha,\beta$-unsaturated carboxylic acid.

48. A resin composition according to claim 47 wherein the $\alpha,\beta$-unsaturated carboxylic acid anhydride copolymerized with the vinyl aromatic compound is selected from the group consisting of maleic anhydride, chloromaleic anhydride, citraconic anhydride, butenylsuccinic anhydride, and tetrahydrophthalic anhydride.

49. A resin composition according to claim 47 wherein the imide compound of $\alpha,\beta$-unsaturated carboxylic acid, copolymerized with the vinyl aromatic compound is that expressed by the general formula:

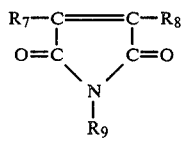

(wherein $R_7$, $R_8$ and $R_9$ are selected from the group consisting of hydrogen atom, alkyl radical, arkenyl radical, cycloalkyl radical, phenyl radical, phenylene radical, and alkylene radical).

50. A resin composition according to claim 49 wherein the imide compound of α,β-unsaturated carboxylic acid is selected from the group consisting of maleimide, N-methylmaleimide, N-cyclohexymaleimide, N-butylmaleimide, N-phenylmaleimide, N-(p-methylphenyl)maleimide, N-(3,5-dimethylphenyl)maleimide, N-(p-methoxyphenyl)maleimide, N-benzylmadeimide, and N-(1-naphthyl) maleimide.

51. A resin composition consisting essentially of 20 to 80 wt. % of poly(2,6-dimethyl-1,4-phenylene) ether and 80 to 20 wt. % of rubber reinforced high impact polystyrene, together with a vinyl aromatic compound resin, which comprises that the poly(2,6-dimethyl-1,4-phenylene) ether consists of an intrinsic viscosity (η) (30° C., chloroform solution) in the range of 0.50 to 0.80, the gel permeation chromatography eluting amount equivalent polystyrene molecular weight of 3000 or less of not more than 5 wt. %, and the isolating amount (after letting stand at 23° C. for 5 hours) from a dichloromethane solution containing 5 wt. % of the poly(2,6-dimethyl-1,4-phenylene) ether, of not less than 70 wt. %.

52. A resin composition according to claim 51 wherein the intrinsic viscosity (η) of the poly(2,6-dimethyl-1,4-phenylene) ether is in the range of 0.60 to 0.75.

53. A resin composition consist essentially of 20 to 80 wt. % of poly(2,6-dimethyl-1,4-phenylene) ether and 80 to 20 wt. % of rubber reinforced high impact polystyrene, together with a vinyl aromatic compound resin, wherein the poly(2,6-dimethyl-1,4-phenylene) ether consist of having an intrinsic viscosity (η) (30° C., chloroform solution) in the range of 0.50 to 0.80, the gel permeation chromatography eluting amount equivalent polystyrene molecular weight of 10,000 or less, of not more than 8 wt. %, and the isolating amount (after letting stand at 23° C. for 5 hours) from a dichloromethane solution containing 5 wt. % of not less than 70 wt. %.

54. A resin composition according to claim 51 wherein the gel permeation chromatography eluting amount equivalent to polystyrene molecular weight of 10,000 or less, of the poly(2,6-dimethyl-1,4-phenylene) ether is not less than 6 wt. %.

55. A resin composition according to claim 51 wherein the isolating amount (after letting stand at 23° C. for 5 hours) from a dichloromethane solution containing 5 wt. % of the poly(2,6-dimethyl-1,4-phenylene) ether is not less than 80 wt. %.

56. A resin composition according to claim 51 wherein the vinyl aromatic compound is a polymer selected from the group consisting of one or more vinyl aromatic compounds, or a copolmer of a vinyl aromatic compound and a compound copolymerizable with the vinyl aromatic compound selected from the group consisting of acrylonitrile, methyl acrylate, acrylate ester α,β-unaturated carboxylic acid anhydride, and imide compound of α,β-unsaturated carboxylic acid.

57. A resin composition according to claim 56 wherein the α,β-unsaturated carboxylic acid anhydride copolymerized with the vinyl aromatic compound is selected from the group consisting of maleic anhydride, chloromaleic anhydride, citraconic anhydride, butenylsuccinic anhydride, and tetrahydrophthalic anhydride.

58. A resin composition according to claim 56 wherein the imide compound of α,β-unsaturated carboxylic acid, copolymerizable with the vinyl aromatic compound is that expressed by the general formula:

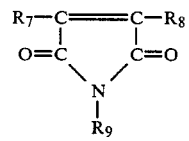

(wherein $R_7$, $R_8$ and $R_9$ are selected from the group consisting of hydrogen atom, alkyl radical, arkenyl radical, cycloalkyl radical, phenyl radical, phenylene radical, or alkenyl radical).

59. A resin composition according to claim 58 wherein the imide compound of α,β-unsaturated carboxylic acid is selected from the group consisting of maleimide, N-methylmaleimide, N-cyclohexylmaleimide, N-butylmaleimide, N-phenylmaleimide, N-(p-methylphenyl)maleimide, N-(3,5-dimethylphenyl)maleimide, N-(p-methoxyphenyl)maleimide, N-benzylmaleimide, and N-(1-naphthyl)maleimide.

60. A resin composition according to claim 51 wherein the rubber content in the composition is in the range of 2.5 to 10 wt. %.

61. A resin composition according to claim 51 wherein the rubber content in the composition is in the range of 3 to 8 wt. %.

62. A resin composition according to claim 26 wherein the intrinsic viscosity (η) of the polyphenylene ether is in the range of 0.55 to 0.75.

63. A resin composition which consists essentially of 20 to 80 wt. % of polypheylene ether, consisting of a constituent unit (I) or constituent units (I) and (II) which are recurring units expressed by the general formulae:

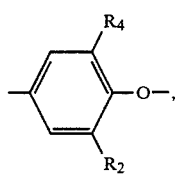

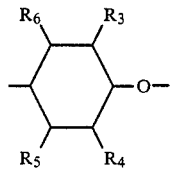

(wherein $R_1$, $R_2$, $R_3$, $R_4$, $R_5$ and $R_6$ are the same or different univalent residues selected from the group consisting of alkyl radical containing one to four carbons, excluding tertiary butyl radical, aryl radicals, halogen and hydrogen, provided $R_5$ and $R_6$ should not be hydrogen at the same time), and 80 to 20 wt. % of rubber reinforced high impact polystyrene, wherein the polyphenylene ether employed has the intrinsic viscosity ($\eta$) (30° C., chloroform solution) in the range 0.50 to 0.80 and the eluting amount equivalent to polystyrene molecular weight of 10,000 or less by gel permeation chromatography of not more than 8 wt. %; and the rubber reinforced high impact polystyrene employed has the volume-average particle size ($\overline{R}v$) in elastomer phase, of 1.0 to 3.5 microns and the ratio of $\overline{R}v$ to $\overline{R}n$ (number-average particle size in the elastomer phase) ($\overline{R}v/\overline{R}n$), of not less than 3.0.

64. A resin composition according to claim 63 wherein the ($\overline{R}v/\overline{R}n$) is not less than 4.0.

65. A resin composition according to claim 63 or claim 64 wherein the composition is 25 to 70 wt. % of polyphenylene ether and 75 to 30 wt. % of rubber reinforced high impact polystyrene.

66. A resin composition according to claim 63 or claim 64 wherein the rubber content in the composition is in the range of 2.5 to 10 wt. %.

67. A resin composition according to claim 63 or claim 64 wherein the rubber content in the composition is in the range of 3 to 8 wt. %.

68. A resin composition according to claim 63 or claim 64 wherein the intrinsic viscosity ($\eta$) of the polyphenylene ether is in the range of 0.55 to 0.75.

69. A resin composition according to claim 63 or claim 64 wherein the gel permeation chromatography eluting amount equivalent to polystyrene molecular weight of 10,000 or less, of the polyphenylene ether is not more than 6 wt. %.

70. A resin composition according to claim 65 wherein the rubber content in the composition is in the range of 2.5 to 10 wt. %.

71. A resin composition according to claim 70 wherein the gel permeation chromatography eluting amount equivalent to polystyrene molecular weight of 10,000 or less, of the polyphenylene ether is not more than 6 wt. %.

72. A resin composition according to claim 65 wherein the gel permeation chromatography eluting amount equivalent to polystyrene molecular weight of 10,000 or less, is not more than 6 wt. %.

73. A resin composition according to claim 65 wherein the rubber content in the composition is in the range of 3 to 8 wt. %.

74. A resin composition according to claim 73 wherein the gel permeation eluting amount equivalent to polystyrene molecular weight of 10,000 or less, of the polyphenylene ether is not more than 6 wt. %.

75. A resin composition according to claim 60 wherein the gel permeation chromatography eluting amount equivalent to polystyrene molecular weight of 10,000 or less, of the polyphenylene ether is not more than 6 wt. %.

76. A resin composition according to claim 67 wherein the gel permeation chromotography eluting amount equivalent to polystyrene molecular weight of 10,000 or less, of the polyphenylene ether is not more than 6 wt. %.

77. A resin composition according to claim 68 wherein the gel permeation chromatography eluting amount equivalent to polystyrene molecular weight of 10,000 or less, of the polyphenylene ether is not more than 6 wt. %.

78. A resin composition consisting essentially of 20 to 80 wt. % of poly(2,6-dimethyl-1,4-phenylene) ether and 80 to 20 wt. % of rubber reinforced high impact polystyrene, wherein the poly(2,6-dimethyl-1,4-phenylene) ether consist of having an intrinsic viscosity ($\eta$) (30° C., chloroform solution) in the range of 0.50 to 0.80, the gel permeation chromatography eluting amount equivalent to polystyrene molecular weight of 10,000 or less of not more than 8%, and the isolating amount (after letting stand at 23° C. for 5 hours) from a dichloromethane solution containing 5 wt. % of the poly(2,6-dimethyl-1,4-phenylene) ether, of not less than 70 wt. %, and the rubber reinforced high impact polystyrene has the volumn-average particle size ($\overline{R}v$) in the elastomer phase, of 1.0 to 3.5 microns and the ratio of $\overline{R}v$ to $\overline{R}n$ (number-average particle size in the elastomer phase ($\overline{R}v/\overline{R}n$) is not less than 3.0.

79. A resin composition according to claim 78 wherein the gel permeation chromatography eluting amount equivalent to polystyrene molecular weight of 10,000 or less, of poly(2,6-dimethyl-1,4-phenylene) ether is not more than 6 wt. %.

80. A resin composition according to claims 78 or 79 wherein the rubber content in the composition is in the range of 2.5 to 10 wt. %.

81. A resin composition according to claims 78 or 79 wherein the rubber content in the composition is in the range of 3 to 7 wt. %.

* * * * *

UNITED STATES PATENT AND TRADEMARK OFFICE
CERTIFICATE OF CORRECTION

PATENT NO. : 4,543,391
DATED : September 24, 1985
INVENTOR(S) : KURIBAYASHI et al It is certified that error appears in the above-identified patent and that said Letters Patent is hereby corrected as shown below:

(1) In claims 1, 3, 20, 43, 45 and 63, for general formula (I) in each claim, change each appearing

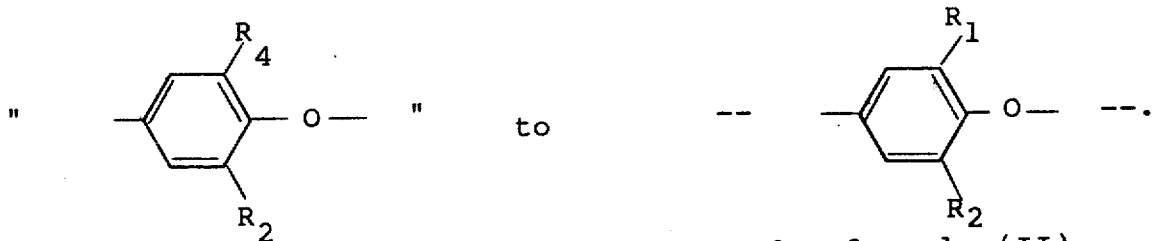

(2) In claims 1, 3, 20, 43, 45 and 63, for formula (II) in each claim, change each appearing

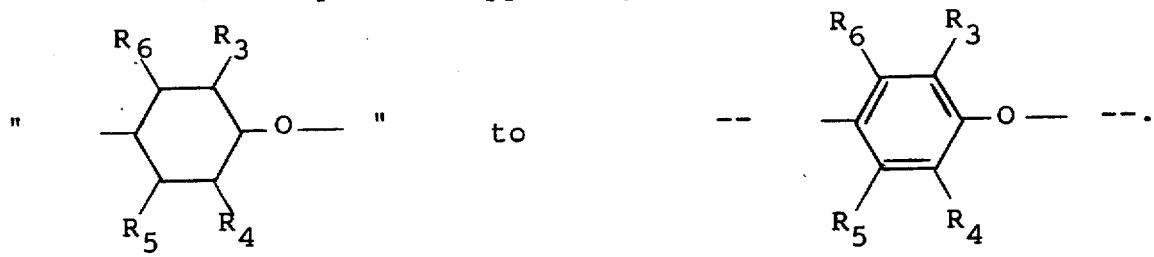

UNITED STATES PATENT AND TRADEMARK OFFICE
CERTIFICATE OF CORRECTION

PATENT NO. : 4,543,391

DATED : September 24, 1985

INVENTOR(S) : KURIBAYASHI et al

It is certified that error appears in the above-identified patent and that said Letters Patent is hereby corrected as shown below:

(3) Column 18, line 1, change "of" to --or--.

Signed and Sealed this

Sixteenth Day of September 1986

[SEAL]

Attest:

DONALD J. QUIGG

*Attesting Officer*  *Commissioner of Patents and Trademarks*